US007639238B2

(12) United States Patent
Hauck

(10) Patent No.: US 7,639,238 B2
(45) Date of Patent: Dec. 29, 2009

(54) METHOD FOR SIMULATING A TOUCH ON A TOUCH SCREEN

(75) Inventor: Karl P. Hauck, Pembroke, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 393 days.

(21) Appl. No.: 11/242,972

(22) Filed: Oct. 4, 2005

(65) Prior Publication Data

US 2006/0202969 A1    Sep. 14, 2006

Related U.S. Application Data

(63) Continuation of application No. 09/998,699, filed on Nov. 30, 2001, now Pat. No. 6,977,646.

(51) Int. Cl.
*G06F 3/41* (2006.01)

(52) U.S. Cl. ........................................ 345/173; 345/178

(58) Field of Classification Search ......... 345/156–158, 345/162, 184, 173–179, 443; 178/19, 20, 178/18.01–18.07; 340/712; 341/22, 20
See application file for complete search history.

(56) References Cited

U.S. PATENT DOCUMENTS

| 4,293,734 | A |   | 10/1981 | Pepper, Jr. |
| 4,570,640 | A | * | 2/1986  | Barsa .......................... 600/554 |
| 4,575,581 | A |   | 3/1986  | Langberg |
| 4,670,738 | A | * | 6/1987  | Weinblatt ..................... 341/20 |
| 4,686,332 | A |   | 8/1987  | Greanias et al. |
| 4,707,845 | A |   | 11/1987 | Krein et al. |
| 4,725,694 | A |   | 2/1988  | Auer et al. |
| 4,853,498 | A |   | 8/1989  | Meadows et al. |
| 4,880,665 | A | * | 11/1989 | Adler et al. .............. 427/126.3 |
| 5,053,757 | A |   | 10/1991 | Meadows |
| 5,111,103 | A | * | 5/1992  | DuBrucq ..................... 313/2.1 |
| 5,162,783 | A |   | 11/1992 | Moreno |
| 5,283,559 | A | * | 2/1994  | Kalendra et al. ............. 345/168 |
| 5,376,946 | A | * | 12/1994 | Mikan ......................... 345/157 |
| 5,428,367 | A | * | 6/1995  | Mikan ......................... 345/157 |
| 5,510,813 | A |   | 4/1996  | Makinwa et al. |
| 5,650,597 | A | * | 7/1997  | Redmayne ............... 178/18.06 |
| 5,717,321 | A | * | 2/1998  | Kerth et al. .................. 323/283 |
| 5,751,276 | A |   | 5/1998  | Shih |
| 5,768,492 | A |   | 6/1998  | Schumer |
| 5,844,506 | A |   | 12/1998 | Binstead |
| 5,886,687 | A | * | 3/1999  | Gibson ....................... 345/173 |

(Continued)

FOREIGN PATENT DOCUMENTS

EP    0 181 612    5/1986

(Continued)

*Primary Examiner*—Prabodh M Dharia
(74) *Attorney, Agent, or Firm*—Steven A. Bern

(57) ABSTRACT

Methods are provided for simulating a touch on a touch screen by applying a first signal to a first surface of the touch screen, applying a second signal to a second, opposing surface of the touch screen sensor, and changing the first signal relative to the second signal. Such methods can be used to simulate a touch to the center of the touch screen, for example. The simulated touch can be used in some embodiments to perform diagnostics and/or calibrations functions.

20 Claims, 11 Drawing Sheets

U.S. PATENT DOCUMENTS

| | | |
|---|---|---|
| 5,901,246 A | 5/1999 | Hoffberg et al. |
| 5,940,065 A | 8/1999 | Babb et al. |
| 5,977,938 A * | 11/1999 | Iwasa ............................ 345/32 |
| 6,016,140 A | 1/2000 | Blouin et al. |
| 6,035,180 A * | 3/2000 | Kubes et al. .............. 455/575.1 |
| 6,072,475 A * | 6/2000 | van Ketwich ................ 345/173 |
| 6,088,069 A * | 7/2000 | Farlow ......................... 349/12 |
| 6,163,616 A * | 12/2000 | Feldman ..................... 382/115 |
| 6,181,328 B1 | 1/2001 | Shieh et al. |
| 6,236,386 B1 | 5/2001 | Watanabe |
| 6,251,014 B1 | 6/2001 | Stockdale et al. |
| 6,262,717 B1 * | 7/2001 | Donohue et al. ............. 345/173 |
| 6,262,718 B1 | 7/2001 | Findlay et al. |
| 6,337,681 B1 | 1/2002 | Martin |
| 6,353,433 B1 | 3/2002 | Schumer |
| 6,456,952 B1 | 9/2002 | Nathan |
| 6,504,530 B1 * | 1/2003 | Wilson et al. ................ 345/173 |
| 6,506,983 B1 | 1/2003 | Babb et al. |
| 6,512,838 B1 | 1/2003 | Rafii et al. |
| 6,632,122 B2 * | 10/2003 | Klitsner et al. .............. 446/484 |
| 6,741,237 B1 * | 5/2004 | Benard et al. ................ 345/173 |
| 6,825,833 B2 | 11/2004 | Mulligan et al. |
| 6,961,049 B2 | 11/2005 | Mulligan et al. |
| 6,977,646 B1 | 12/2005 | Hauck et al. |
| 7,034,808 B2 | 4/2006 | Sakata et al. |
| 7,079,118 B2 * | 7/2006 | Benard et al. ................ 345/173 |
| 7,154,481 B2 | 12/2006 | Cross et al. |
| 7,236,161 B2 * | 6/2007 | Geaghan et al. ............. 345/173 |
| RE39,881 E * | 10/2007 | Flowers .................... 178/18.01 |
| 7,362,313 B2 * | 4/2008 | Geaghan et al. ............. 345/173 |
| 2001/0032057 A1 | 10/2001 | Smith et al. |
| 2002/0050983 A1 * | 5/2002 | Liu et al. ..................... 345/173 |
| 2003/0058226 A1 | 3/2003 | Bertram et al. |
| 2003/0063073 A1 | 4/2003 | Geaghan et al. |
| 2003/0067451 A1 | 4/2003 | Tagg et al. |
| 2004/0017362 A1 | 1/2004 | Mulligan et al. |
| 2004/0022444 A1 | 2/2004 | Rhoads |
| 2004/0140993 A1 * | 7/2004 | Geaghan et al. ............. 345/702 |
| 2004/0164970 A1 * | 8/2004 | Benard et al. ................ 345/177 |
| 2004/0178997 A1 | 9/2004 | Gillespie et al. |
| 2004/0183787 A1 * | 9/2004 | Geaghan et al. ............. 345/173 |
| 2005/0041018 A1 | 2/2005 | Philipp |
| 2007/0229511 A1 * | 10/2007 | Silverbrook et al. ......... 345/443 |
| 2008/0062144 A1 * | 3/2008 | Shahoian et al. ............. 345/173 |
| 2008/0079349 A1 * | 4/2008 | Miyazaki et al. ............. 313/495 |

FOREIGN PATENT DOCUMENTS

| | | |
|---|---|---|
| EP | 0 283 249 | 9/1988 |
| EP | 0 665 508 | 8/1995 |
| EP | 1 179 768 | 2/2002 |
| JP | 06-175768 | 6/1994 |
| JP | 07-182093 | 7/1995 |
| JP | 7182093 | 7/1995 |
| WO | WO 2004/068332 A2 | 8/2004 |

\* cited by examiner

METHOD FOR SIMULATING A TOUCH ON A TOUCH SCREEN

This is a continuation of U.S. Ser. No. 09/998,699, filed Nov. 30, 2001 now U.S. Pat No. 6,977,646.

BACKGROUND

A typical touch screen employs a sheet of glass with a conductive coating such as indium tin oxide with four terminal connections, one at each corner. The touch screen may also be a capacitive or resistive touch screen with a pattern of electrodes made of conductive material. A finger, stylus, or conductive top sheet can draw or inject current at the point of contact. The current can then distribute to the touch panel terminals in a proportionate manner relative to the location of the point of contact. The accuracy of the touch screen thus depends on how well the division of current among the terminals represents the contact location. To help correlate point of contact signals with correct position data, touch screens are calibrated. Calibration usually takes place during manufacturing, and in some cases recalibration can be performed by an end user, for example. Calibration can also include diagnostic functions whereby uncorrectable errors can be found and a non-functioning status can be indicated.

SUMMARY OF THE INVENTION

Frequent calibration and recalibration of a touch screen may be desirable in many situations. Whether the touch screen is a capacitive touch screen or resistive touch screen, the impedance of the linearization pattern and the active and passive components of the sensing and control circuits can change over time due to aging and environmental conditions, among other things. Such changes in conditions can introduce errors in the division of the current among the terminals, resulting in reporting erroneous point of contact information. Errors in the division of current can also occur because of differences in the gains of the circuits or differences in impedances associated with each terminal.

In typical operator-performed recalibration, individual touches are made at a number of predetermined test points whose locations are known. Any difference between a known location and a measured location represents an error that is taken into account during subsequent touch position measurements. Such manual recalibration requires that the human operator interrupt work and execute the calibration procedure, possibly reducing efficiency. The frequency that recalibration may be needed tends to increase as ambient conditions change, for example as the temperature changes by more than a specified amount. Additionally, the repeatability of operator recalibration may be poor due to difficulties involved with touching the test points in the same way and with the same impedance each time recalibration is performed. Also, there is a possibility that many erroneous touch points are registered before a user becomes aware that recalibration should be performed.

The present invention provides a calibration system and method that does not require users to touch test points and that can be performed automatically, for example on a periodic basis, on a scheduled basis, on an event basis (e.g., on power-up or after a specified period of user inactivity), on a detected threshold basis (e.g., after a temperature change of a specified number of degrees), or the like. According to the present invention, an effective, automatic touch screen calibration system and method can be realized by applying a calibration impedance to the terminals of a touch screen, sensing the effect of the calibration impedance on each terminal, then calculating the X,Y position indicated for each terminal. This simulated touch information can be used to calculate the offset for each terminal and apply those offsets to obtain the corrected touch position from the measured touch position, and/or to calculating the gain error indicated for each terminal and apply the gain error to obtain the corrected touch position from the measured touch position.

The present invention features a touch screen calibration system that includes a touch screen having a plurality of terminals and a control circuit for applying a signal to the terminals and sensing effects on the signal caused by a simulated touch on the touch screen. A switching circuit can be provided to apply a calibration impedance to the terminals. A microprocessor can be configured to calculate the calibration X,Y position indicated for each terminal upon application of the calibration impedance, and in response to the calibration position to calculate the offset for each terminal and apply those offsets to obtain the corrected touch position from the measured touch position. A diagnostic function can be provided to report error conditions when signals measured during calibration are outside predetermined limits.

In an exemplary embodiment, the microprocessor may be further configured to interpolate the offsets as a function of the relative X, Y positions of the measured touch position, periodically operate the switching circuit, and prevent operations of the switching circuit, at least while the touch screen is actively in use. The period of the timing may be changed in response to a predetermined change in the sensed quantity. The sensor circuit may sense temperature. There may be four terminals. The same calibration impedance may be applied to each terminal. The touch screen may be a capacitive touch screen or resistive touch screen.

The invention also features a method of touch screen calibration including applying a signal to the terminals of a touch screen, applying a calibration impedance to the terminals and sensing the effect on the signal of the calibration impedance applied to the terminals. The calibration X, Y position is calculated for each terminal upon application of the calibration impedance and the offset for each terminal is calculated and applied to obtain the corrected touch position from a measured touch position.

In an exemplary embodiment, the offsets are used as input to simultaneous differential equations that model the screen errors as a two dimensional Taylor series. In another embodiment, the offsets are interpolated as a function of the relative calibration X, Y positions of the measured touch position.

The invention also features a method of touch screen calibration including applying a signal to the terminals of a touch screen, applying a calibration impedance at the center of the touch screen and sensing the effect on the signal of the calibration impedance. The calibration X,Y position is calculated upon application of the calibration impedance and the position error is calculated and may be applied to obtain the corrected touch position from a measured touch position. A diagnostic function can be provided to report error conditions when signals measured during calibration are outside predetermined limits.

This invention also features a touch screen calibration system including a touch screen having a plurality of terminals in the control circuit for applying a signal to the terminals and sensing the effect on the signal due to a touch on the touch screen. The switching circuit applies a calibration impedance to the terminals and a microprocessor is configured to calculate the gain error indicated for each terminal upon application of the calibration impedance and applies those gain errors to obtain a corrected touch position from the measured touch position. In a preferred embodiment the microprocessor may be further configured to normalize the gain error, store the normalized gain error, and apply the normalized gain error to subsequently measured touch positions.

This invention also features a method of touch screen calibration including applying a signal to the terminals of a touch screen and applying a calibration impedance to the terminals, and then sensing the effect on the signal of the calibration impedance supplied to the terminals. The gain error indicated for each terminal is calculated upon application of the calibration impedance and the gain error is applied to obtain the corrected touch position from the measured touch position.

BRIEF DESCRIPTION OF THE DRAWINGS

The invention may be more completely understood in consideration of the following detailed description of various embodiments of the invention in connection with the accompanying drawings, in which.

Figure 1:
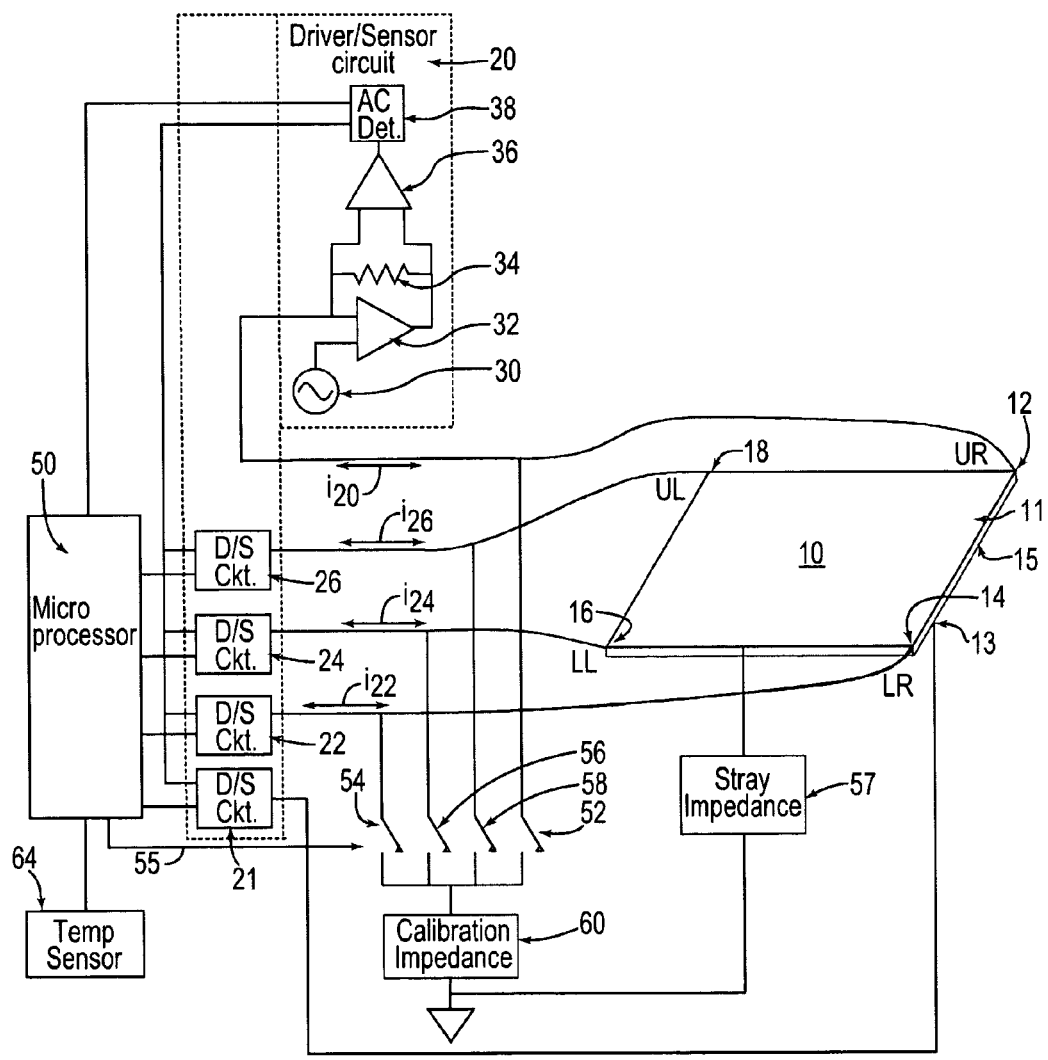
FIG. 1 is a simplified schematic diagram of a touch screen with a calibration system according to this invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Touch screen calibration includes connection of a calibration impedance to terminals of a sensor, measuring errors with the calibration impedance, and correcting errors or reporting fault conditions where errors cannot be corrected. Error correction can be accomplished through any suitable method. Exemplary error correction schemes include position correction by bilinear interpolation based on coefficients generated by simultaneous differential equations that model the screen errors as a two dimensional Taylor series, bilinear interpolation based on measured terminal errors, and error correction based on gain correction.

There is shown in FIG. 1 a touch screen 10 having four corner terminals 12, 14, 16 and 18 in contact with resistive surface 11 on the top surface of touch screen 10. A fifth terminal 13 is in contact with conductive rear surface 15 of touch screen 10. The rear surface 15 is normally driven with the same AC voltage as the terminals on front surface 11, so the effective capacitance between front surface 11 and rear surface 15 is reduced to nearly zero. Rear surface 15 may also serve as a shield against electrical noise. Connected to each one of these terminals is a driver sensor circuit 20, 22, 24, 26, and 21, respectively, only one of which, circuit 20, is shown in detail.

As shown, circuit 20 includes an AC voltage source 30 connected to amplifier 32 which applies a drive signal current through feedback resistor 34 to corner terminal 12, and a differential amplifier 36 which measures current $i_{20}$ flowing to terminal 12. Source 30 may be selectively switched off so zero volts are applied to the terminal. AC detector circuit 38 demodulates the current signal measured by amplifier 36 and performs analog to digital conversion on the resulting signal. The digital data from circuit 38 is fed to microprocessor 50. The output from each driver sensor circuit 20, 21, 22, 24 and 26 is delivered to microprocessor 50.

Four switches 52, 54, 56 and 58 (e.g., typically semiconductor switches or other integrated circuit switching devices), are used to connect calibration impedance 60 to terminals 12, 14, 16 and 18, one at a time, respectively. Calibration impedance 60 may be capacitive impedance or it may be a resistive impedance. As shown in FIG. 1, the same impedance can be connected in turn to each of the terminals. More generally, an individual impedance may be associated with each of the switches if desired. By using a single impedance for all of the terminals, the same impedance can be connected to each, thereby reducing possible error sources. Switches 52, 54, 56 and 58 can be operated via control connection 55 by microprocessor 50, which, for example, may be responsive to a temperature sensor 64 as will be explained hereinafter in more detail with reference to FIG. 2.

Figure 2:
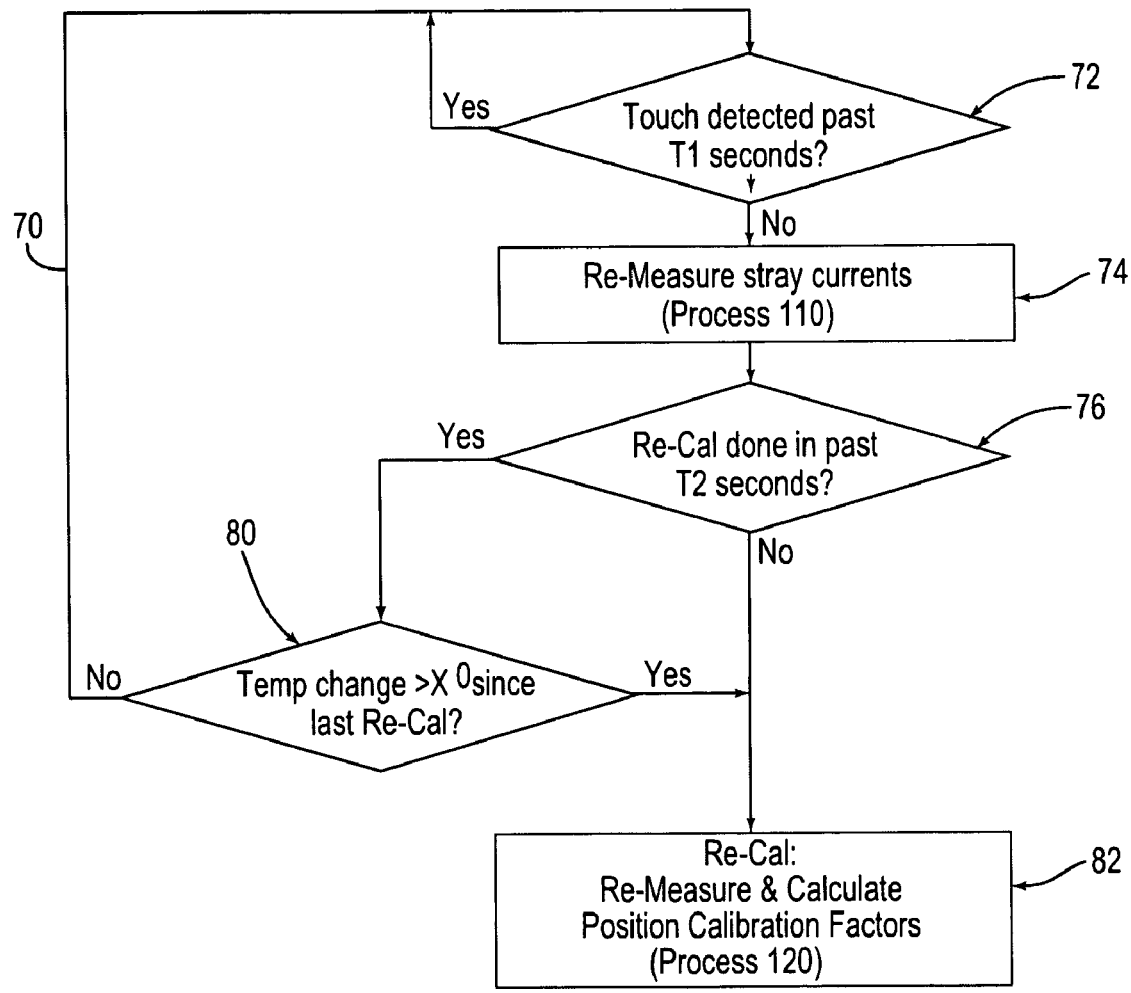
FIG. 2 is a flow chart of re-calibration timing algorithm performed by the microprocessor

The timing at which certain processes are performed according to the system and method of the present invention can vary according to specified parameters as indicated by flow chart 70 in FIG. 2. For example, measuring stray current, step 74, and calibration of the touch screen step 82 can be performed prior to normal operation, during periods of user inactivity as determined by the steps 72 and 76, after a large temperature change has been detected as determined by step 80, and the like. Microprocessor 50 may periodically perform calibration at times with a certain periodicity, and the periodicity may be changed, for example, in response to an output from temperature sensor 64 as indicated by steps 76 and 80. When a rate of change of temperature of more than a predetermined amount occurs, microprocessor 50 may increase the frequency of operation of the re-calibration modes described herein, as indicated by step 82. Calibration and stray impedance measurement can be made to automatically pause or abort during user touching activity, and if desired can be made to resume immediately after touch activity, at some later time, or during the normal course of operation.

Figure 3A:
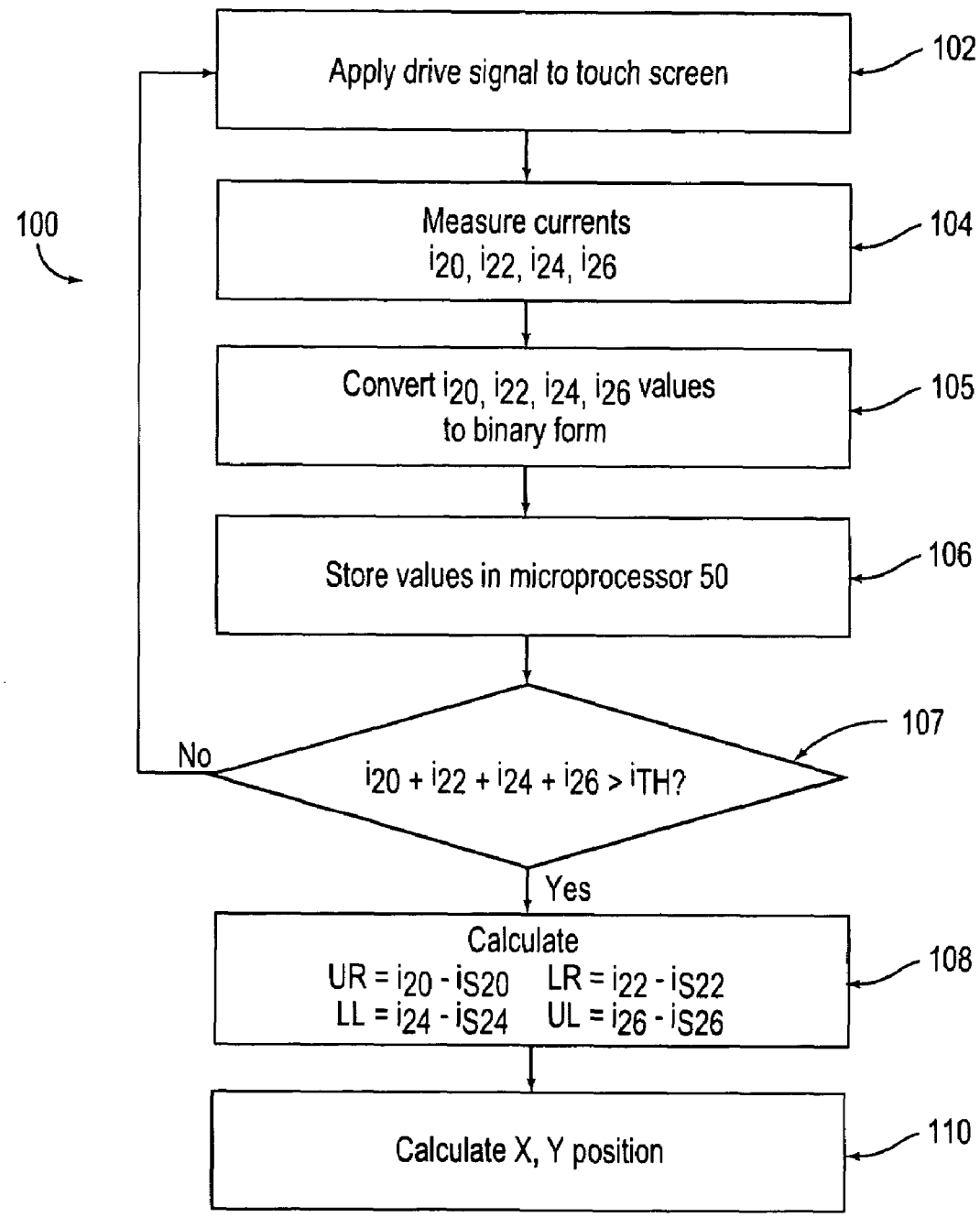
FIG. 3A is a flow chart showing the signal measurement process according to this invention.
Figure 3B:
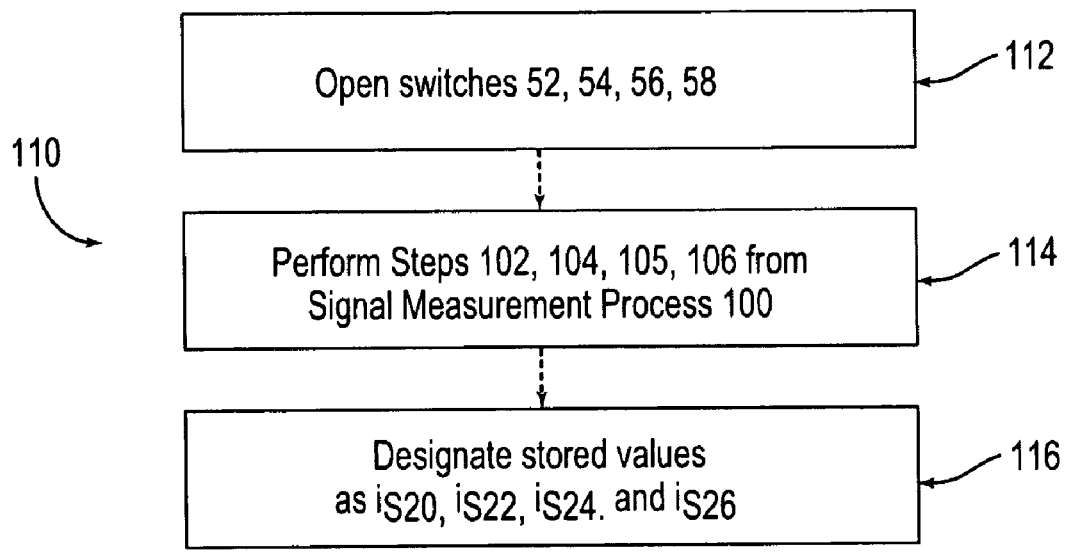
FIG. 3B is a flow chart showing the stray current measurement process according to this invention.

Processes shown in FIG. 3A and 3B can be used to make current measurements and calculate incremental touch signals. FIG. 3A shows a basic process 100 that can be used in all measurements in methods of the present invention. Process 100 includes applying a drive signal which may be applied to all touch screen terminals or may be applied only to the topsheet of a resistive touch screen, step 102; measuring the currents flowing in each terminal, step 104; converting the current signals to binary form, step 105; and storing the signal values in microprocessor 50, step 106. In step 107 of process 100, the sum of measured currents, minus stray currents, is tested to determine if it exceeds a predetermined threshold level, $i_{TH}$. If it does not, the process is re-started at step 102. If it does, signal magnitude is large enough for a valid measurement so that UL, UR, LL, and LR can be calculated in step 108 where the stray currents are determined by process 110, for example. Equations 1 and 2 (detailed below) can then be used to calculate an X, Y position giving the UL, UR, LL, and LR values from step 108.

Stray impedance can be measured using process 110 shown in FIG. 3B. Switches 52, 54, 56, and 58 are opened, step 112, the driver sensor circuits are operated and measurements are made of currents $i_{20}$, $i_{22}$, $i_{24}$, and $i_{26}$ flowing into touch screen 10, step 114. These current measurements are converted as indicated in step 114 to binary form and stored in microprocessor 50, step 116, with the designations $i_{S20}$, $i_{S22}$, $i_{S24}$, and $i_{S26}$, representing the current flowing into stray capacitive and resistive impedances 57 coupling screen 10 and its interconnecting cables to ground. Measurements of signals resulting from stray impedances are done when the touch screen system is first powered on, and they may be done periodically thereafter, for example under control of process 70.

Microprocessor 50 uses the calculated values designated UR (upper right), LR (lower right), LL (lower left) and UL (upper left) from each of terminals 12, 14, 16 and 18 respectively, to calculate position and to calculate the X, Y calibration factor for the one of the terminals to which the calibration impedance 60 is connected at that moment. To calculate position, microprocessor 50 executes the touch formulas for the X and Y positions:

$$X = \frac{(UR+LR)-(UL+LL)}{UR+LR+UL+LL} \quad (1)$$

$$Y = \frac{(UR+UL)-(LR+LL)}{UR+LR+UL+LL} \quad (2)$$

Where UR=$i_{20}$-$i_{s20}$, LR=$i_{22}$-$i_{s22}$, UL=$i_{26}$-$i_{s26}$, and LL=$i_{24}$-$i_{s24}$. Touch positions thus obtained are used in microprocessor 50 to generate the touch position coordinates and X error, Y error, and local error offsets to be applied to subsequently-measured touch positions to achieve an error-corrected position.

Figure 3C:
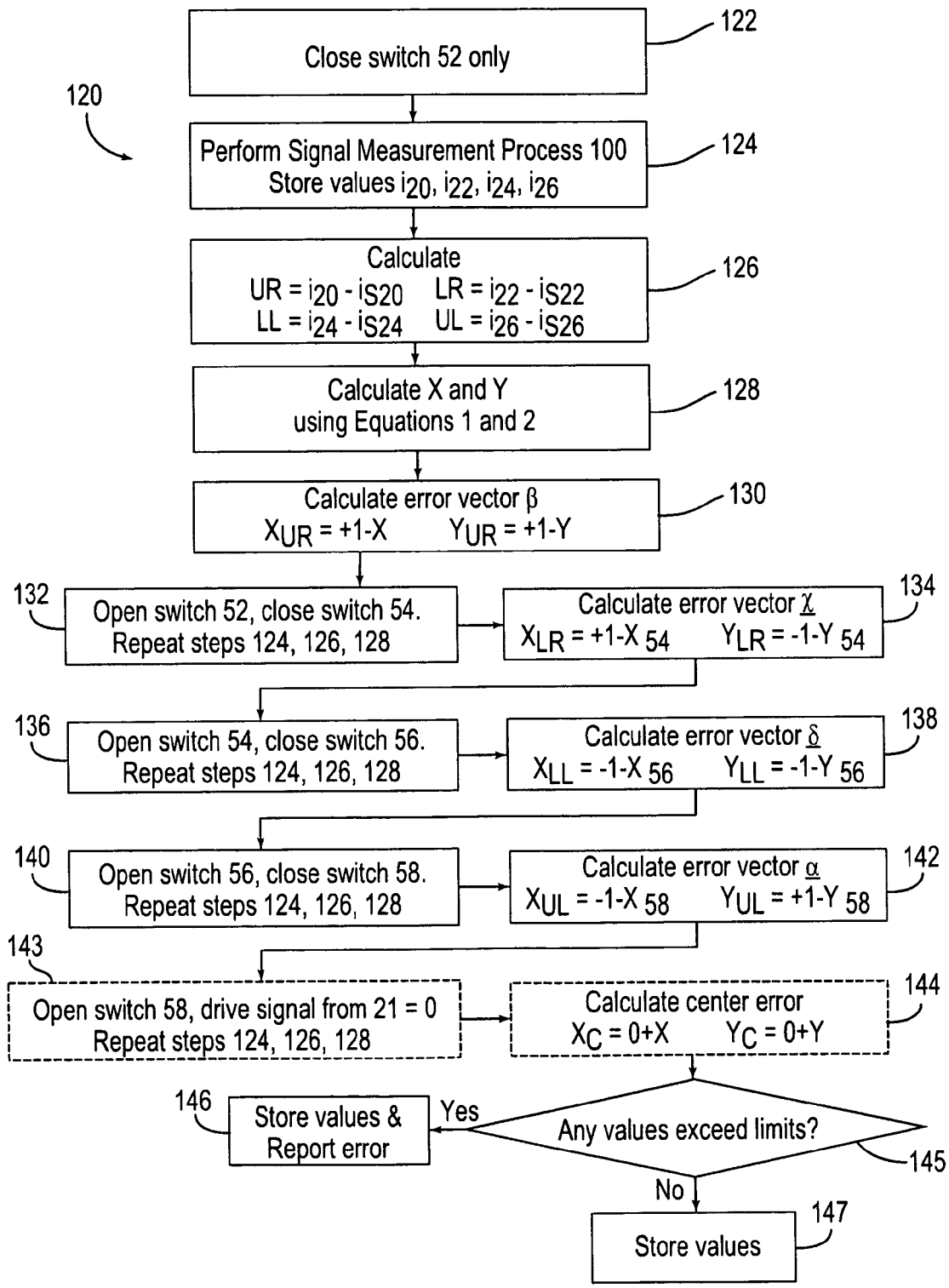
FIG. 3C is a flow chart showing the position calibration vectors measurement and calculation according to this invention.
Figure 4:
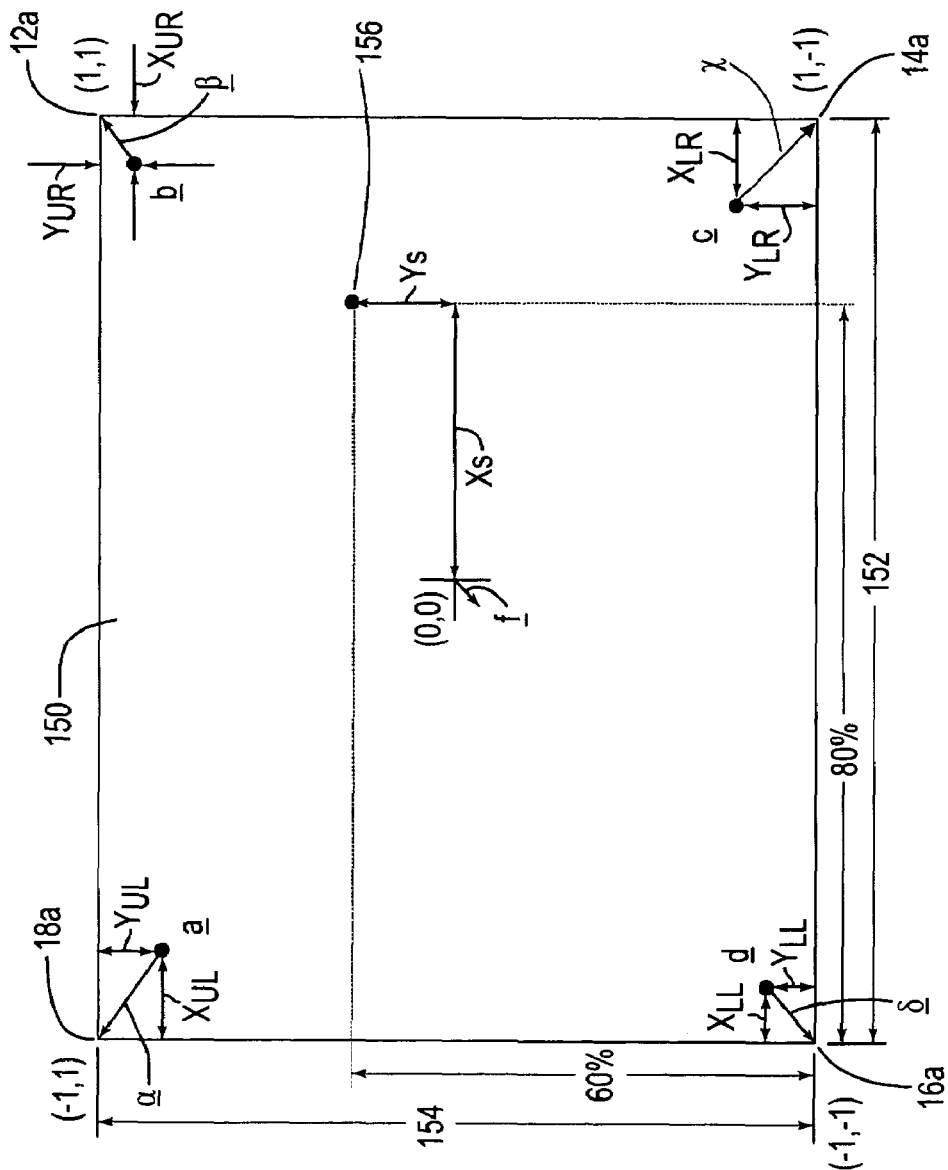
FIG. 4 is a diagram of a touch screen with error vectors.

Position calibration factors can be measured and calculated according to process 120 shown in FIG. 3C, and may be further understood with reference to FIGS. 1 and 4. Calibration impedance 60 can be applied to terminal 12, step 122, so that signals can be measured, step 124. Given these measurements, UL, UR, LL, LR can calculated, step 126. The X, Y position can then be calculated, step 128. Error vector β=$X_{UR}$,$Y_{UR}$ can then be calculated for terminal 12, step 130, where the correction factors are defined as $X_{UR}$=1-$X_{52}$ and $Y_{UR}$=1-$Y_{52}$. Processes analogous to 122 through 130 are then repeated for each remaining terminal of the touch screen, as indicated by steps 132 through 142, resulting in X and Y correction factors for each terminal of the touch screen, and defining the remaining error vectors α=$X_{UL}$, $Y_{UL}$; χ=$X_{LR}$, $Y_{LR}$; and δ=$X_{LL}$, $Y_{LL}$.

Errors in the center of touch screen 10 may be measured in step 143, where the AC voltage source in driver sensor circuit 21 is turned off, then steps 124, 126, and 128 are performed. Turning off or reducing the AC signal to terminal 13 has the effect of significantly increasing the conduction due to capacitance between the front surface 11 and rear surface 15, thus a calibration capacitor is applied to the center of touch screen 10. The center error is then calculated according to the equations shown in step 144. In step 145, values generated in steps 122 through 144 are evaluated to determine if they exceed predetermined limits. If so, an error is reported and values are stored, step 146. If not, values are stored, step 147. Errors may include open or shorted connections in the touch screen system, failed electronic circuits, or touch screen impedances that are larger or smaller than specified limits.

Some steps of process 120 may be used independently from others, for example center touch calibration steps 143 and 144 may be omitted or they may be performed separately. Diagnostic steps 145 and 146 can be omitted or they may be performed in combination with steps 143 and 144 or in combination with steps 122 through 142.

The correction offsets α, β, χ, δ are valid for the coordinate limits (e.g. four corners) of the touch screen 10. Correction algorithms can then be used to apply these correction offsets in proportion to all areas of the touch screen. Any suitable error correction algorithm can be used to apply the correction offsets in an appropriate manner across the touch screen for calibration. Exemplary methods include those based on bilinear interpolation and those based on gain correction. Center touch offsets can be incorporated into correction algorithms and to perform diagnostics, though center offset is not used for error correction in the examples shown herein.

To illustrate a bilinear interpolation correction method, reference is made to FIG. 4, which shows a diagram of touch screen 150 with virtual touch points a(x,y), b(x,y), c(x,y), and d(x,y). These virtual touch points are examples of the X, Y positions for each of the corners that may result from application of touch impedance 60 to the terminals in process 120, steps 140, 122, 132, and 136 respectively. The corresponding error correction vectors α=$X_{UL}$, $Y_{UL}$; β=$X_{UR}$, $Y_{UR}$; χ=$X_{LR}$, $Y_{LR}$; and δ=$X_{LL}$, $Y_{LL}$ resulting from process 120 are also indicated. For each corner of touch screen 150, the measured results can be corrected to ideal coordinates P by the equations:

$$P_a = a + \alpha, \quad (3)$$

$$P_b = b + \beta, \quad (4)$$

$$P_c = c + \chi, \quad (5)$$

$$P_d = d + \delta. \quad (6)$$

More generally, the corrected position P can be stated as:

$$P = p + \epsilon(p) \quad (7)$$

Where p is the position measured by the controller and ε is a vector function of p which the error vector. The function ε must be derived from available information.

For simplicity it is easier to consider one mapping function K, which is defined as follows:

$$P = K(p) \quad (8)$$

The second order Taylor expansion for a vector function has the form:

$$P = F(p) = F(0) + \left.\frac{\delta F}{\delta x}\right|_0 p_y + \left.\frac{\delta F}{\delta y}\right|_0 p_x + \left.\frac{\delta^2 F}{\delta x \delta y}\right|_0 p_x p_y \qquad (9)$$

Therefore the assumption is made that K is a non-linear function with general form $$P_x = K_x(x) = Ax + By + Cxy + D \qquad (10)$$

$$P_y = K_y(y) = Ex + Fy + Gxy + H \qquad (11)$$

Unknowns A to H can be determined by solving simultaneous equations 12 and 13, expressed in matrix form, where the elements of vector a described above are shown as $a_x$ and $a_y$, likewise for the vectors b, c and d.

The matrix derived from Kx(x) is:

$$\begin{pmatrix} a_x & a_y & a_x a_y & 1 \\ b_x & b_y & b_x b_y & 1 \\ c_x & c_y & c_x c_y & 1 \\ d_x & d_y & d_x d_y & 1 \end{pmatrix} \begin{pmatrix} A \\ B \\ C \\ D \end{pmatrix} = \begin{pmatrix} -1 \\ 1 \\ 1 \\ -1 \end{pmatrix} \qquad (12)$$

And the matrix derived from Ky(y) is:

$$\begin{pmatrix} a_x & a_y & a_x a_y & 1 \\ b_x & b_y & b_x b_y & 1 \\ c_x & c_y & c_x c_y & 1 \\ d_x & d_y & d_x d_y & 1 \end{pmatrix} \begin{pmatrix} F \\ F \\ G \\ H \end{pmatrix} = \begin{pmatrix} 1 \\ 1 \\ -1 \\ -1 \end{pmatrix} \qquad (13)$$

Having calculated terms A through H prior to normal operation of the touch screen system, $K_x$ and $K_y$ are applied to subsequent measured and calculated touch points to perform error correction and normalization to the desired range of (−1,−1) to (1,1) prior to reporting of corrected position data.

Figure 5A:
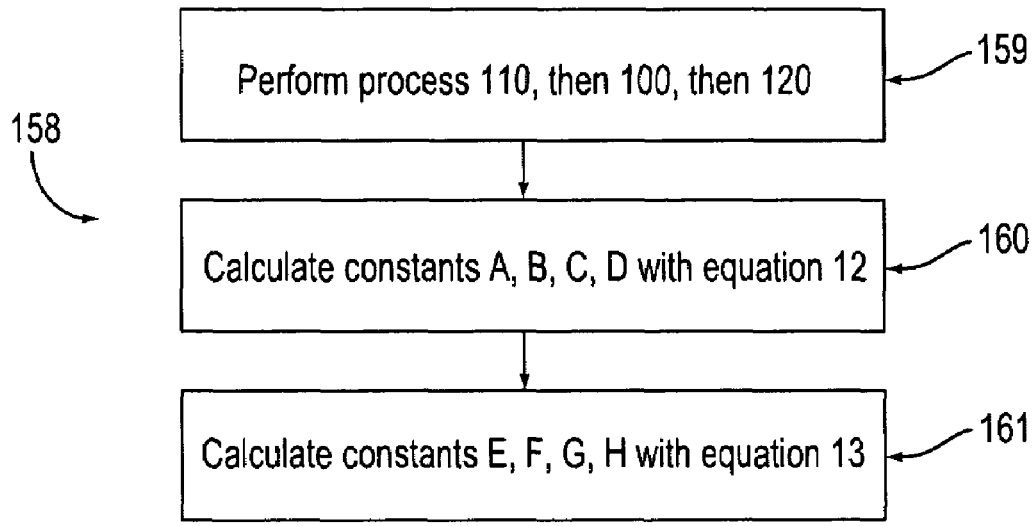
FIG. 5A is a flowchart for calculating calibration coefficients according to this invention.
Figure 5B:
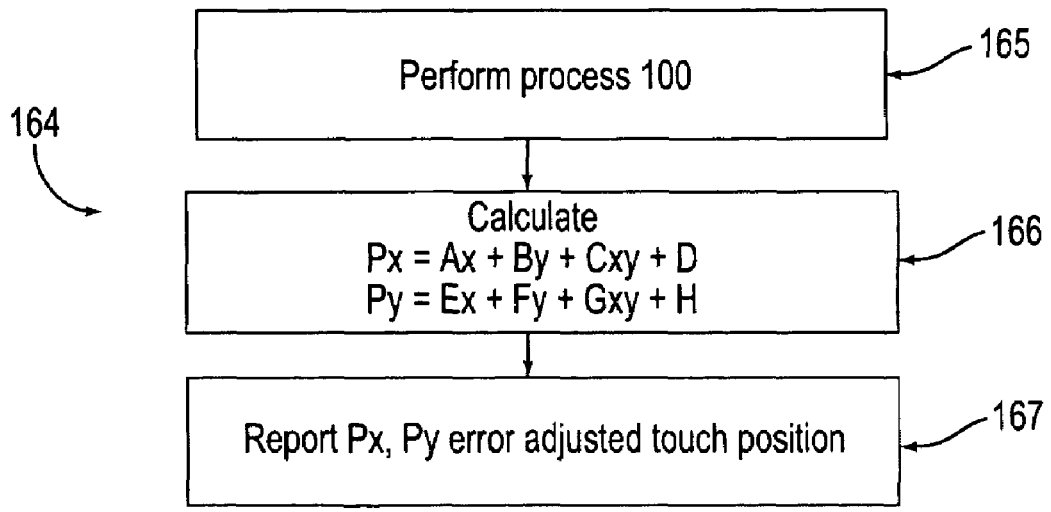
FIG. 5B is a flowchart for applying calibration coefficients to calculate a corrected touch position according to this invention.

FIG. 5A shows process 158 for calculating coefficients A-H, including first performing measurement and calculations of calibration touch points, step 159. Then coefficients A-D are calculated in step 160, and coefficients E-H are calculated in step 161. Process 158 is performed soon after power-up of the touch system, and may be performed periodically thereafter, for example in accordance with process 70. Then during normal operation of the touch system, process 164 is performed each time a measurement is made. FIG. 5B shows process 164, comprising measuring a touch event and calculating an X, Y position, step 165; and calculation of coefficients, step 166; followed by reporting of error-adjusted position, step 167.

Figure 6:
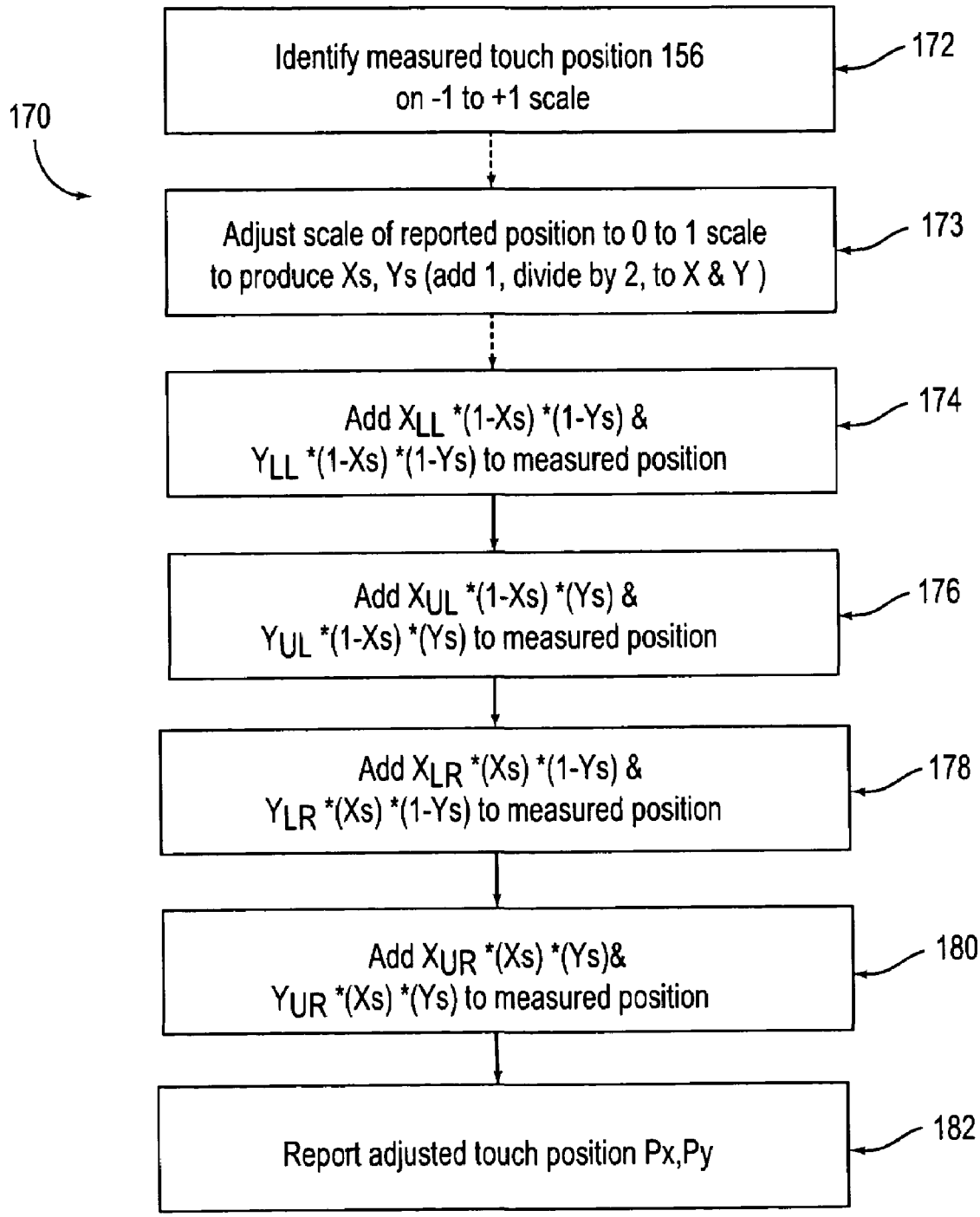
FIG. 6 is a flowchart for applying calibration offsets to calculate a corrected touch position according to this invention.

FIG. 6 shows another method for applying the correction offset vectors $\alpha = X_{UL}, Y_{UL}$; $\beta = X_{UR}, Y_{UR}$; $\chi = X_{LR}, Y_{LR}$; and $\delta = X_{LL}, Y_{LL}$ to a measured touch position to get the corrected touch position. Such method uses a bilinear interpolation process that can be expressed in the general form of equations 10 and 11, but it is executed in algorithmic form rather than using a matrix inversion to calculate the eight coefficients of equations 10 and 11. In step 172 a measured touch position is identified. Touch position 156 is shown by example in FIG. 4. Then the normalized relative position of the touch in the X and Y direction is determined, Xs and Ys, step 173. Following this, offsets $X_{LL}, Y_{LL}$ are added to the measured position in proportion to (1−Xs)*(1−Ys), step 174. Then the UL offsets $X_{UL}, Y_{UL}$ are added in proportion to (1−Xs)*(Ys), step 176. Then the LR offsets $X_{LR}, Y_{LR}$ are added in proportion to (Xs)*(1−Ys)], step 178. Then the UR offsets $X_{UR}, Y_{UR}$ are added in proportion to (Xs)*(Ys), step 180. The corrected position Px, Py is then reported, step 182.

A particular example of the interpolation technique is shown in FIG. 4 where the touch screen shown at 150 has its four corners 12a, 14a, 16a and 18a with signals labeled UR, LR, LL and UL, respectively derived from step 126. Each one of these X and Y directions are depicted as dimensions 152 and 154 and each of the terminals has a nominal positional value of, for example, UR=(+1+1), LR=(+1−1), LL=(−1−1), UL=(−1+1).

Assume for the sake of example that terminal 12a has a correction offset of β=0.03, 0.06. Terminal 14a has a correction offset of χ=0.07, −0.04. Terminal 16a has a correction offset of δ=−0.08, −0.02 and Terminal 18a a correction offset of α=−0.01, 0.07. Since the touch point 156 is determined to be 80% of the way along the X axis from terminal 16a to terminal 14a, and 60% of the way along the Y axis from terminal 16a to terminal 18a the scaling for each of the corner offsets is as follows.

LL offset scale=(100%−80%=20%)*(100%−60%=40%)=8%.

UL offset scale=(100%−80%=20%)*(60%)=12%.

LR offset scale=(80%)*(100%−60%=40%)=32%.

UR offset scale=(80%)*(60%)=48%.

Then calculate:

8%*δ=(−0.0064, −0.0016),

12%*α=(−0.0012, 0.0084),

32%*χ=(0.0224, −0.0128),

48%*β=(0.0144, 0.0288), and add the four scaled offsets in each of the X and Y directions to the uncorrected position of (0.6, 0.2) for a grand total of (0.6292, 0.2228). This corrected touch position is then reported.

This method has been included in the text both because of the relative simplicity with which the coefficients can be calculated and the clarity in which it demonstrates that the corrections are applied. This method will correct a 1% error to within 0.01%, but a 10% error will only be corrected within 1%. The uncorrected error results from the fact that the correction is not included when the correction is calculated. This error could be removed by an iterative process, or by solving for the error values that would result in the appropriate corrections being calculated exactly. The result of removing the errors would be essentially equivalent to the previously-illustrated method of solving simultaneous differential equations, which results in precise corrections at the corner points. the choice of method used generally depends on the desired level of accuracy, the tolerance of the system for error, the available processor resources (e.g., speed, memory, etc.), and the like.

Figure 7:
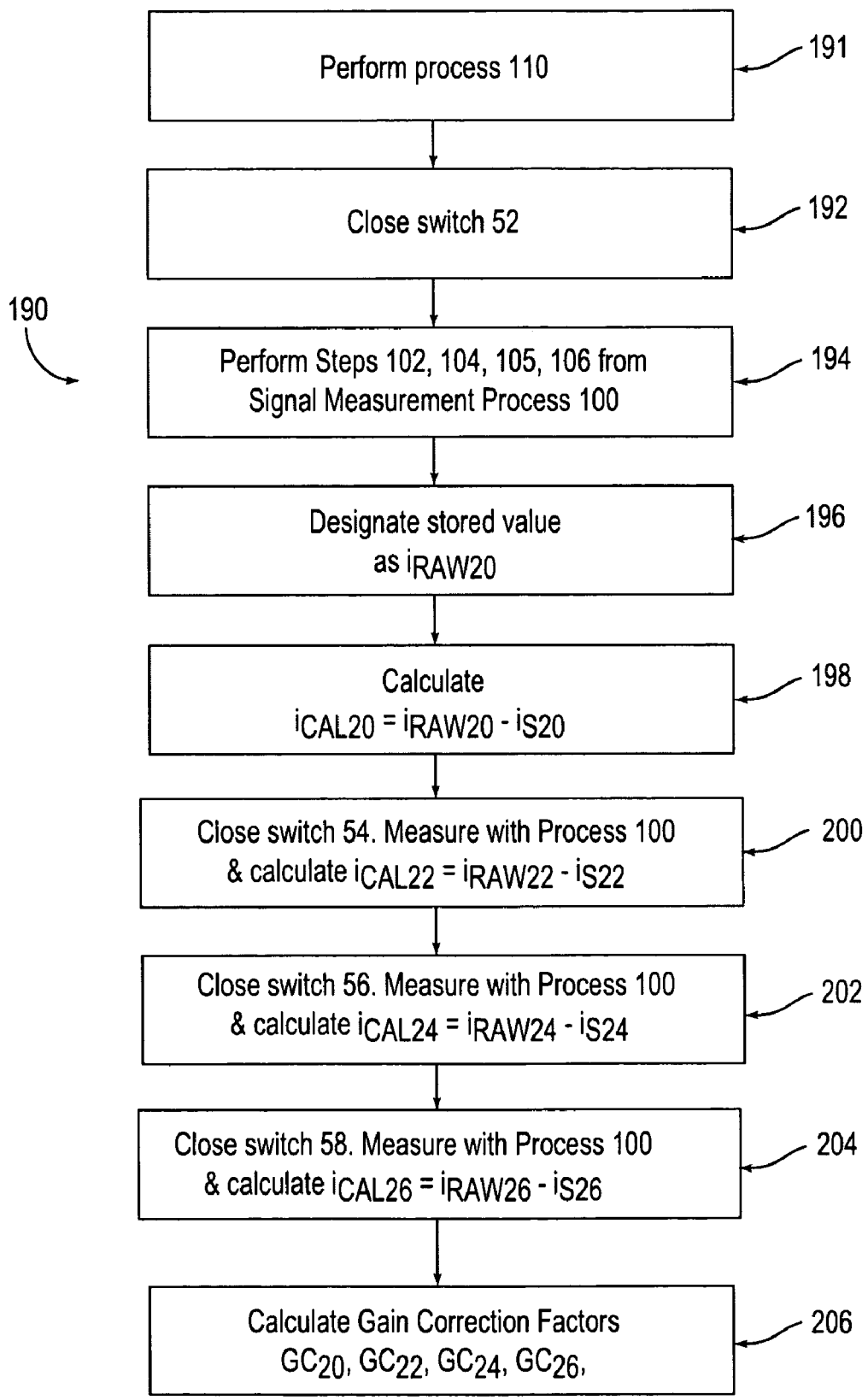
FIG. 7 is a flowchart of gain correction factors measurement and calculation.
Figure 8:
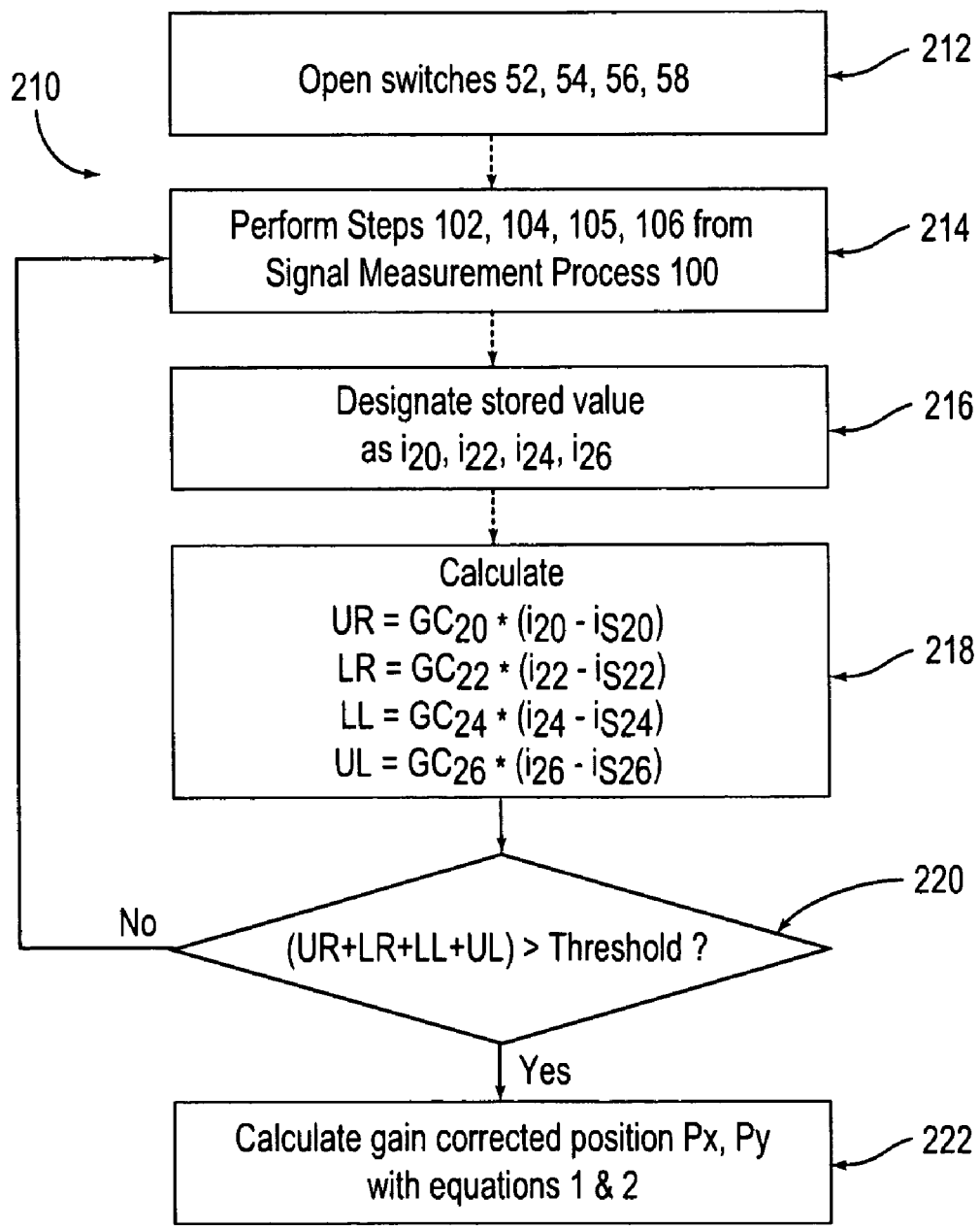
FIG. 8 is a flowchart of an algorithm used for position measurement with gain error correction.

A gain correction approach can also be used as the error correction method, and can be understood with reference to FIG. 1, FIG. 7, and FIG. 8. First, process 190 is performed to generate gain correction factors. Stray current values are established, step 191. Driver sensor circuit 20 is then connected to calibration impedance 60 and current $i_{20}$ is measured and stored in step 196, with the designation $i_{raw20}$. Then $i_{cal20}$ is calculated. In steps 200, 202, and 204 switches 54, 56, and 58 are sequentially closed, the measurement and storage steps are repeated, and $i_{cal22}$, $i_{cal24}$, and $i_{cal26}$ are calculated, respectively. Gain correction factors are then calculated in microprocessor 50 for each of the driver sensor circuits 20, 22, 24, and 26 in step 206 by the following equations:

$$GC_{20}=(i_{CAL20}+i_{CAL22}+i_{CAL24}+i_{CAL26})/(4*i_{CAL20}) \quad (14)$$

$$GC_{22}=(i_{CAL20}+i_{CAL22}+i_{CAL24}+i_{CAL26})/(4*i_{CAL22}) \quad (15)$$

$$GC_{24}=(i_{CAL20}+i_{CAL22}+i_{CAL24}+i_{CAL26})/(4*i_{CAL24}) \quad (16)$$

$$GC_{26}=(i_{CAL20}+i_{CAL22}+i_{CAL24}+i_{CAL26})/(4*i_{CAL26}) \quad (17)$$

Subsequent current measurement operations are performed as shown in the flow chart in FIG. 8, where switches are opened, step 212. Each measurement of $i_{20}$, $i_{22}$, $i_{24}$, and $i_{26}$, step 214 is stored, step 216, and then modified to a stray-corrected and gain-corrected value in microprocessor 50 by the equations shown in step 218. Next a test is done to determine if the values UR, LR, LL, and UL are above a predetermined threshold level, step 220. If the threshold is exceeded, a corrected touch position is calculated, step 222.

In touch systems that are capable of measuring phase of the measured signals, the signals measured and calculations performed in processes 100, 110, 120, and all subsequent process calculations will use complex numbers. In this case the gain correction factors may be a complex numbers as well. The gain correction method may be used in conjunction with a bilinear interpolation method.

Figure 9:
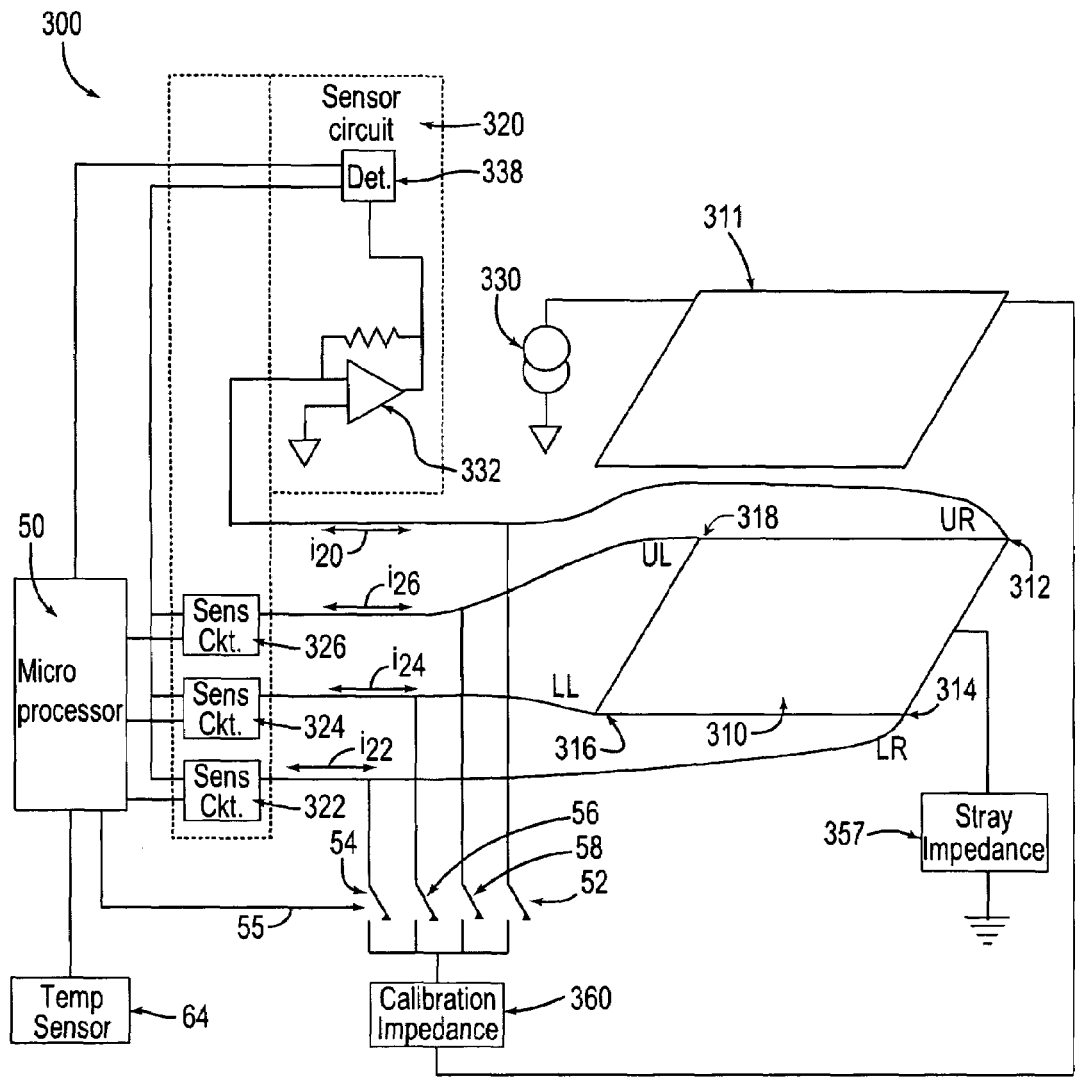
FIG. 9 is a simplified schematic diagram of a resistive touch screen with a calibration system according to this invention.

FIG. 9 schematically shows a resistive touch screen, for example like the resistive touch screens commercially available from 3M Touch Systems, Inc., Methuen, Mass. Current source 330 applies a drive signal to topsheet 311. A finger or stylus touch on top sheet 311 results in electrical contact and current flows to substrate 310, distributing to the four corner terminals 312, 314, 316 and 318 proportionally, depending on the location of the contact. Connected to each one of these terminals is a sensor circuit 320, 322, 324 and 326, respectively, only one of which, circuit 320, is shown in detail. Circuit 320 receives current from corner terminal 312 through amplifier 332, and to detector circuit 338 which performs analog to digital conversion on the signal. The digital data from circuit 338 is fed to microprocessor 50. The output from each sensor circuit 320, 322, 324 and 326 is delivered to microprocessor 50. Four switches 52, 54, 56, and 58 (e.g., typically semiconductor switches or other integrated circuit switching devices), are used to connect calibration impedance 360 to terminals 312, 314, 316 and 318, one at a time, respectively. Calibration impedance 360 may be capacitive impedance or it may be a resistive impedance, and it may have substantially 0 impedance. As shown in FIG. 9, the same impedance can be connected in turn to each of the terminals. Switches 52, 54, 56 and 58 can be operated via control connection 55 by microprocessor 50, which, for example, may be responsive to a temperature sensor 64.

The resistive touch system shown in FIG. 9 can be used with a combination of process 70, 100, 110, 120, 158, 164, 170, 190, and process 210 to achieve calibration according to this invention. Resistive touch systems including 4 wire and 5 wire types may be calibrated with the methods described herein.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

Each of the patents, patent documents, and publications cited above is hereby incorporated into this document as if reproduced in full.

What is claimed is:

1. A method of simulating a touch on a touch screen sensor having a top surface and a bottom surface, the top surface including a resistive layer configured to detect touch inputs and the bottom surface including a conductive layer, the method comprising:

applying a first signal to the resistive layer of the top surface;

applying a second signal to the conductive layer of the bottom surface; and in the absence of a touch input to the touch screen, changing the first signal relative to the second signal to produce a simulated touch at an expected location on the touch screen sensor.

2. The method of claim 1, wherein the first and second signals comprise AC voltage signals.

3. The method of claim 1, wherein the expected location is at the touch screen center.

4. The method of claim 1, further comprising calculating an observed position for the simulated touch.

5. The method of claim 4, further comprising comparing the observed position with the expected location to develop an error value.

6. The method of claim 5, further comprising using the error value to perform a diagnostics function.

7. The method of claim 5, further comprising using the error value to perform a calibration function.

8. The method of claim 1, wherein the conductive layer of the bottom surface is configured for shielding the resistive layer during normal touch input detection operations.

9. The method of claim 1, wherein the touch screen sensor is a capacitive touch screen sensor.

10. The method of claim 1, wherein the recited steps are performed automatically on a periodic basis.

11. The method of claim 1, wherein the recited steps are performed automatically on a scheduled basis.

12. The method of claim 1, wherein the recited steps are performed automatically on power-up of a computer system for which the touch screen sensor provides a user input interface.

13. The method of claim 1, wherein the recited steps are performed automatically after a period of user inactivity.

14. The method of claim 1, wherein the recited steps are performed automatically responsive to a detected threshold.

15. A method of simulating a touch on a touch screen sensor having a top surface and a bottom surface, the top surface including a resistive layer configured to detect touch inputs and the bottom surface including a conductive layer, the method comprising:

applying a first signal to the resistive layer of the top surface;

applying a second signal to the conductive layer of the bottom surface; and in the absence of a touch input to the touch screen, changing the first signal relative to the second signal to produce a simulated touch at an expected location on the touch screen sensor, wherein the recited steps are performed automatically responsive to a detected threshold that is based on a temperature measurement.

16. A method of calibrating a touch screen sensor having a top surface and a bottom surface, the top surface including a resistive layer configured to detect touch inputs and the bottom surface including a conductive layer, the method comprising the steps of:

applying a first signal to the resistive layer of the top surface;

applying a second signal to the conductive layer of the bottom surface;

changing the first signal relative to the second signal to produce a simulated touch at an expected location on the touch screen sensor;

calculating an observed position for the simulated touch;

comparing the observed position with the expected location to determine an error; and using the error value to calibrate the touch screen sensor.

17. The method of claim 16, wherein the steps are performed automatically in the absence of a touch input to the touch screen sensor.

18. The method of claim 17, wherein the steps are performed automatically on at least one of: a periodic basis, on a scheduled basis, on power-up of a computer system for which the touch screen sensor provides a user input interface, after a period of user inactivity, and responsive to a detected threshold.

19. The method of claim 17, wherein the steps are performed automatically responsive to an ambient condition measured by a sensor.

20. The method of claim 19, wherein the ambient condition is a temperature.

* * * * *

UNITED STATES PATENT AND TRADEMARK OFFICE
CERTIFICATE OF CORRECTION

| | | |
|---|---|---|
| PATENT NO. | : 7,639,238 B2 | Page 1 of 1 |
| APPLICATION NO. | : 11/242972 | |
| DATED | : December 29, 2009 | |
| INVENTOR(S) | : Karl Hauck | |

It is certified that error appears in the above-identified patent and that said Letters Patent is hereby corrected as shown below:

Column 3

Line 23; Delete "microprocessor" and insert -- microprocessor; -- therefor.
Line 31; Delete "vectors." and insert -- vectors; -- therefor.

Column 6

Line 59; Delete "which" and insert -- which yields -- therefor.

Column 8

Line 3; Delete "Ys)]," and insert -- Ys), -- therefor.
Line 22; Delete "follows." and insert -- follows: -- therefor.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO.        : 7,639,238 B2                                      Page 1 of 1
APPLICATION NO. : 11/242972
DATED             : December 29, 2009
INVENTOR(S)       : Karl P. Hauck It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Ninth Day of November, 2010

David J. Kappos
*Director of the United States Patent and Trademark Office*